(12) United States Patent
Lin

(10) Patent No.: US 11,091,118 B2
(45) Date of Patent: Aug. 17, 2021

(54) INFLATOR

(71) Applicant: Key Safety Systems Inc., Sterling Heignts, MI (US)

(72) Inventor: Qiong Lin, Lakeland, FL (US)

(73) Assignee: Key Safety Systems Inc., Sterling Heights, MI (US)

( * ) Notice: Subject to any disclaimer, the term of this patent is extended or adjusted under 35 U.S.C. 154(b) by 139 days.

(21) Appl. No.: 16/474,456

(22) PCT Filed: Dec. 5, 2017

(86) PCT No.: PCT/US2017/064705
§ 371 (c)(1),
(2) Date: Jun. 27, 2019

(87) PCT Pub. No.: WO2018/125526
PCT Pub. Date: Jul. 5, 2018

(65) Prior Publication Data
US 2019/0337481 A1 Nov. 7, 2019

Related U.S. Application Data

(60) Provisional application No. 62/439,652, filed on Dec. 28, 2016.

(51) Int. Cl.
*B60R 21/264* (2006.01)
*B60R 21/26* (2011.01)

(52) U.S. Cl.
CPC . *B60R 21/2644* (2013.01); *B60R 2021/26011* (2013.01); *B60R 2021/2648* (2013.01)

(58) Field of Classification Search
CPC ......... B60R 21/2644; B60R 2021/2611; B60R 2021/2648
See application file for complete search history.

(56) References Cited

U.S. PATENT DOCUMENTS 7,114,746 B2 * 10/2006 Miyaji ................ B60R 21/2644
280/741
7,669,893 B2 3/2010 Jager et al.
(Continued)

FOREIGN PATENT DOCUMENTS

DE 102014111040 A1 * 2/2016 ......... B60R 21/2644
WO 2007041006 4/2007

OTHER PUBLICATIONS

Machine translation of DE-102014111040-A1 obtained from worldwide. espacenet.com Dec. 22, 2020.*

*Primary Examiner* — Ruth Ilan
*Assistant Examiner* — Maxwell L Meshaka
(74) *Attorney, Agent, or Firm* — Meunier Carlin & Curfman LLC

(57) ABSTRACT

A cylindrical inflator has an elongated tubular housing, a hollow tubular filter and a plurality of gas generant pellets. The elongated tubular housing has a first end sealed by an igniter assembly and an opposite second end sealed by a diffuser assembly. The diffuser assembly has a first set of discharge openings sealed by frangible foil, and a combustion chamber interposed and extending between the igniter assembly and the foil sealed diffuser assembly. The hollow tubular filter is positioned inside the combustion chamber and has an enlarged first end compressed against an inner wall of the elongated tubular housing and an elongated narrow portion extending from the enlarged first end of the hollow tubular filter toward the second end of the tubular housing.

11 Claims, 2 Drawing Sheets

(56) References Cited

U.S. PATENT DOCUMENTS

| | | | |
|---|---|---|---|
| 8,123,878 B1 * | 2/2012 | Krupp | B60R 21/2644 |
| | | | 149/2 |
| 8,302,992 B2 * | 11/2012 | Hanano | B60R 21/2644 |
| | | | 280/740 |
| 8,376,400 B2 | 2/2013 | Mason et al. | |
| 8,496,266 B2 | 7/2013 | Gmitter et al. | |
| 9,051,224 B2 | 6/2015 | Mason et al. | |
| 9,114,778 B2 | 8/2015 | Hanano et al. | |
| 2005/0011393 A1 * | 1/2005 | Kelly | B60R 21/2644 |
| | | | 102/430 |
| 2014/0230685 A1 * | 8/2014 | Hanano | B60R 21/2644 |
| | | | 102/530 |

* cited by examiner

INFLATOR

FIELD OF THE INVENTION

The present invention relates to an airbag inflation device, more particularly to an improved inflator having a tubular cylindrical shaped housing filled with a gas generant which, when ignited, produces an inflation gas to inflate an airbag cushion.

BACKGROUND OF THE INVENTION

Airbag cushions are commonly inflated using an inflator filled with a solid pyrotechnic material that, when combusted, generates large volumes of inflation gas.

These devices are most typically configured with an electrical ignition device that when signaled to fire, activates a squib that generates a spark to ignite a small amount of propellant called an enhancer in a sealed self-contained chamber that typically has one opening sealed by a rupture disk or a frangible foil axially located in the housing. As the enhancer rapidly burns, the foil seal bursts and the burning charge of the enhancer ignites a larger volume of gas generant material in the form of solid pellets typically stored in a larger combustion chamber which create the necessary gases to inflate the airbag.

The inflators for side airbags are typically elongated cylindrical or tubular devices. The prior art often shows an elongated inflator with a tubular housing having an initiator/enhancer on one end, a combustion chamber in the middle, a passage between the combustion chamber and the inner/inside surface of the outer wall of the housing and in an end opposite the enhancer/initiator a diffuser mechanism. Many prior art patents refer to the flow path of gas and how it is constructed by the inflator parts which create a change in direction of the gas flow as the gas escapes radially and enters a narrow hollow passage about the combustion chamber and then flows axially toward a diffuser/throttle end and then finally out the inflator. This narrow hollow passage is formed between the narrow portion of the combustion chamber and the inside wall of the outer housing tube allowing the gas flows into the narrow hollow passage to cool prior to bursting a sealed opening and then escape out a diffuser.

This configuration is shown in prior art patents U.S. Pat. No. 9,114,778 Daicel; U.S. Pat. No. 7,669,893 Takata; U.S. Pat. No. 8,376,400 Takata; U.S. Pat. No. 8,496,266 Takata; U.S. Pat. No. 8,302,992 Daicel and U.S. Pat. No. 9,051,224. This use of a double wall inflator, while reasonably efficient, comes with a size penalty particularly in terms of the outside diameter and even the length.

Other prior art inflators utilize a substantial filter outside the sealed chamber to cool gases coming from the throttle opening. In prior inventions, gas flow was controlled by one opening in an axial direction that is sealed with a disk or fragile foil. This requires high burn rate propellants which has high gas temperatures and flaming is inevitable.

It is an object of the present invention to achieve a more efficient use of space allowing for more combustion material to be stored in a smaller diameter inflator while still providing the necessary cooling and debris filtration of the burning gas generant material.

SUMMARY OF THE INVENTION

A cylindrical inflator has an elongated tubular housing, a hollow tubular filter and a plurality of gas generant pellets. The elongated tubular housing has a first end sealed by an igniter assembly and an opposite second end sealed by a diffuser assembly. The diffuser assembly has a first set of discharge openings sealed by frangible foil, and a combustion chamber interposed and extending between the igniter assembly and the foil sealed diffuser assembly. The hollow tubular filter is positioned inside the combustion chamber and has an enlarged first end compressed against an inner wall of the elongated tubular housing and an elongated narrow portion extending from the enlarged first end of the hollow tubular filter toward the second end of the tubular housing. The narrow portion has an end attached to or abutting an internal end of the diffuser assembly. The elongated narrow portion is spaced from the elongated tubular housing to form a gas discharge plenum. The plurality of gas generant pellets at least partially filling the combustion chamber. Upon ignition, the gas generant pellets generate inflation gases under pressure to enter and pass through the narrow portion of the hollow tubular filter filling the gas discharge plenum and bursting the foil opening the discharge openings and passing out the diffuser.

The gas discharge plenum externally encircles the narrow portion of the filter. The gas discharge plenum extends longitudinally between the enlarged portion of the filter to the second end of the tubular housing. The inflation gas generates a pressure of the ignited gas generant that applies a seal burst force directed radially inwardly toward a center axis of the inflator. Preferably, the diffuser assembly has a second set of a plurality of gas discharge openings positioned radially to direct gas flow radially outward.

BRIEF DESCRIPTION OF THE DRAWINGS

The invention will be described by way of example and with reference to the accompanying drawings in which.

DETAILED DESCRIPTION OF THE INVENTION

Figure 1:
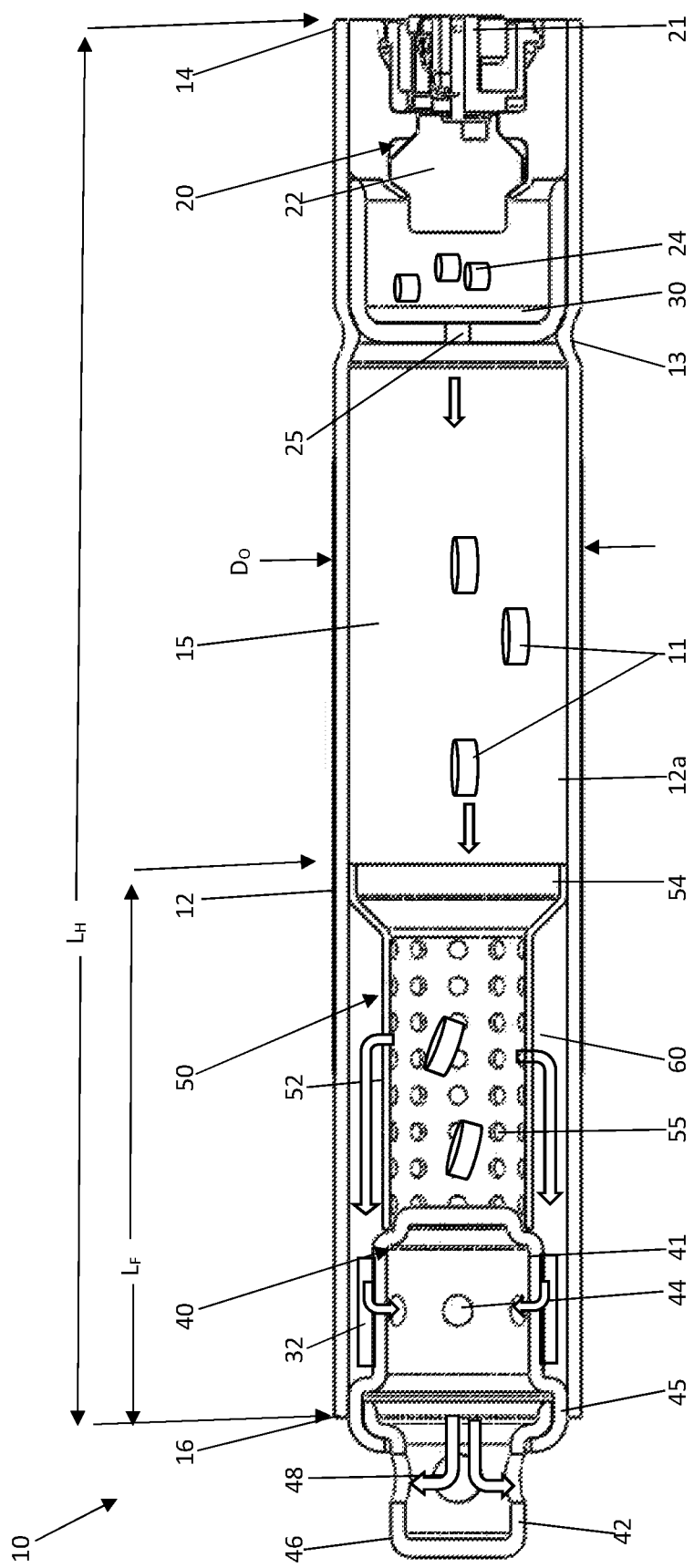
FIG. 1 is a cross-sectional view of a cylindrical inflator of a first embodiment made according to the present invention.

With reference to FIG. 1, a cylindrical inflator 10 made according to a first embodiment of the present invention is illustrated. The inflator 10 has an elongated tubular housing 12, having a first end 14 sealed by an igniter assembly 20 and an opposite second end 16 sealed by a diffuser assembly 40. The diffuser assembly 40 has a first set of discharge openings 44 sealed by a frangible foil 32. The housing 12 has a combustion chamber 15 interposed and extending between the igniter assembly 20 and the foil sealed diffuser assembly 40. A hollow tubular filter 50 is positioned inside the combustion chamber 15. The hollow tubular filter 50 has an enlarged first end 54 which is compressed against an inner wall 12a of the elongated tubular housing 12. The filter 50 has an elongated narrow portion 52 extending from the enlarged end 54 toward the second end 16 of the tubular housing 12 and is attached to an internal end 41 of the diffuser assembly 40, as illustrated.

As shown, the elongated narrow portion 52 of the filter 50 is spaced from the tubular housing 12 inner wall 12a configured to form a gas discharge plenum 60. As shown, the hollow tubular filter 50 is made of perforated metal rolled into a cylindrical shape with an enlarged end 54. The perforations or openings 55 are shown dispersed 360 degrees along the narrow portion 52 such that discharging gases may pass through the narrow portion 52 and into the gas discharge plenum 60. The internal combustion chamber 15 is filled with gas generant pellets 11. These gas generant pellets 11 can fill the entire chamber 15 including internal of the narrow portion 52 of the hollow tubular filter 50 in such a way that a large quantity of gas generant pellets 11 can be positioned inside the inflator 10. This is true because the combustion chamber 15 includes not only the volume of the tubular housing 12, but also includes that portion of the volume occupied by the filter 50. As shown, the inflator housing 12 has an overall length $L_H$ and is attached to the diffuser 40 in such a way that the enlarged portion 45 of the diffuser 40 terminates in proximity of the end 16 of the housing 12. As shown, the filter extends inwardly from the end of the housing 12 a distance $L_F$, the distance $L_F$ being less than half the distance of the housing length $L_H$. This is important in that the filter 50 which is supported at the diffuser end 41 is also supported by being pressed against the surfaces of the inner wall 12a of the housing 12 at the enlarged end 54 of the filter and in a fashion that allows the filter 50 to be shortened substantially over those found in the prior art. This beneficially allows the entire inflator 10 aft of the filter 50 to be filled with gas generant pellets 11 and internal of the filter 50 similarly can be filled with gas generant pellets so a large volume of gas generant pellets 11 can be added to the assembly without increasing the overall diameter of the inflator 10. As shown, the exemplary inflator 10 has an outside diameter $D_O$ of 35 mm and an overall length of 25.4 cm (10 inches or less). This can be adjusted upward or downward, however, it is believed most beneficial that the overall size of the inflator 10, particularly the diameter, be kept to a minimum so that more volume is available to provide for folding of the uninflated airbag cushion that it will fill.

With reference to the igniter assembly 20, as shown the igniter assembly 20 has electrical prongs 21 configured to connect to an electrical wiring harness to activate the inflator 10 in the event of a collision or crash that is sensed. The igniter assembly 20 further includes a squib or pyrotechnic device 22 that upon receiving an electrical signal activates generating a spark which then causes enhancer material 24 to be ignited. When the enhancer material 24 is ignited, an increase in pressure occurs and a frangible seal 30 is ruptured allowing the enhancer gases to enter the combustion chamber 15 through a discharge opening 25. As these burning enhancer gases pass into the combustion chamber 15, they will ignite the gas generant pellets 11. When this occurs, the gas generant pellets 11 will burn rapidly and the gases will attempt to escape through the perforated metal hollow tubular filter 50. As the gases escape through the openings 55 of the filter 50, they enter into the gas discharge plenum 60 at which point hot gases and any debris not captured by the filter 50 are trapped generally inside the filter housing as the pressure builds up a foil 32 wrapped externally about the first set of discharge openings 44 of the diffuser 40 is ruptured radially inward. When this rupture occurs, the openings 44 allow the gas being generated to flow radially inward into the diffuser 40 and thereafter escape out radially outward via the discharge openings 48 at the end 46 of the diffuser 40, as shown by the arrows showing the direction of this flow. The arrangement of the discharge openings 48 creates a balanced flow neutral flow pattern by having the discharge openings 48 arranged around the circumference so radial thrust is canceled by the plurality of openings 48. With the flow neutral pattern, if the inflator is ignited at the wrong time the resultant thrust of the gas forces is virtually zero and the inflator 10 will not move. This prevents the inflator from acting like a rocket which is possible with a linear exit flow, when the inflator is not physically attached to something or restrained such as during shipping.

With reference to the igniter assembly 20, the tubular housing 12 is shown with a crimp 13 which is used as a stop for the igniter assembly 20. The igniter assembly 20, when slipped into position inside the tubular housing 12, abuts the crimp or stop 13 and is press fit in or otherwise welded in position to the housing 12 creating a sealed end 14.

With reference to the opposite end 16, the diffuser 40 is shown formed with two metal components. The inner component 41 is press fit into the housing 12 and includes the first set of discharge openings 44. This portion 41 of the diffuser 40 has flared portion 45 which is pressed against the inner wall 12a of the housing 12 and can be welded or sealed in place such that it is permanently affixed to the housing 12. The remaining outer component of the diffuser 42 is encapsulated and crimped internal of the first portion 41 at the flared portion 45 in such a way that it includes the discharge openings 48 through which the inflation gases escape the inflator 10 to inflate an airbag during inflation.

With reference to the inflator 10, it is important to note that a large volume of gas generant can be collected and stored safely in this device and upon burning the flames and other hot material will be directed immediately into the filter 50 where the discharge of the gases creating the highest temperatures can be cooled and discharged out the diffuser 40 by use of the small holes 55 of the tubular filter 50 and holes 44 of diffuser 40. Because of the gas cooling effect of the tubular filter and the diffuser holes, gas discharge plenum 60 is shortened compared to the prior art devices, it allows for a sufficient amount of space between the filter 50 and the inner wall of the tubular housing 12 such that sufficient cooling can be achieved without the risk of burning the airbag cushion. In the prior art, the use of long narrow filters as the sole source for the gas generant material greatly reduced the amount of gas generant pellets that could be inserted into a small volume. With the present invention a larger amount of combustion material is easily contained within the filter 50 and the housing 12 in spite of the fact that the outside diameter Do is maintained at 35 mm or less. Ideally, the plenum 60 is spaced from the inflator inner wall 12a to allow the gases to cool. The size of the plenum 60 can be lengthened or shortened or made deeper or narrower as a way to tune or control the inflation gases as desired.

Figure 2:
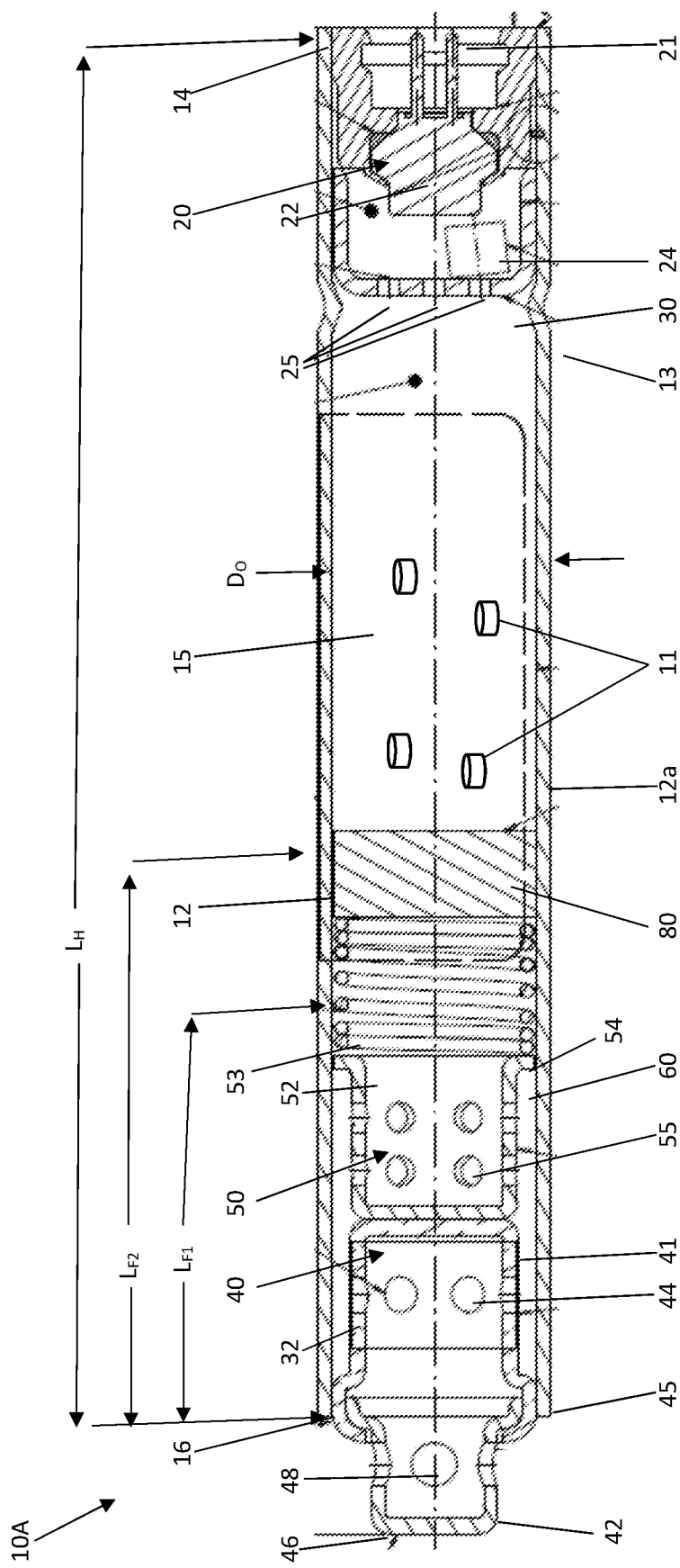
FIG. 2 is a cross-sectional view of a cylindrical inflator of a second embodiment made according to the present invention in a post ignition state.

With reference to FIG. 2 of a second or alternative embodiment of the present invention is shown wherein the hollow tubular filter 50 is shown within the inflator 10A abutting the diffuser 40. The enlarged end 54 is formed as a flange 54 that tightly fits inside the inflator body. The overall length of this hollow tubular filter 50 of the first embodiment is longer than the overall length of the filter 50 of the embodiment shown in FIG. 2. This shorter length allows a compressible spring 53 having a first end to be positioned at the enlarged end 54 abutting the flange 54.

Adjacent the spring 53 at a second end is a porous filter 80. The porous filter 80 can be made of a steel woven or unwoven mesh material preferably of sufficient stiffness to compress the spring 53 when the inflator is filled with the gas generant pellets 11. As shown, the spring 53 and porous filter 80 when compressed will extend to a length $L_{F1}$ allowing an additional volume of pellets 11 to fill the inflator along the distances $L_{F2}$-$L_{F1}$.

Most beneficially like the first embodiment inflator 10 the second embodiment inflator has the porous filter 80, the compressible spring 53 and short tubular filter 50 allowing more generant pellets 11 to be packed into the inflator 10A when the assembly is made and the spring 53 and filter 80 move to the $L_{F1}$ filled position. The use of a compressible spring 53 and the filter 80 pushes against the stored pellets 11 in a way to prevent the pellets 11 from rattling making the inflator of the second embodiment a noise dampened inflator 10A.

Another feature of the second embodiment is the igniter assembly instead of having a single discharge opening 25 has a plurality of discharge openings 25 for passing the burning enhancer material 24 causing the frangible seal 30 to burst and igniting the gas generant pellets 11. When a sufficient amount of the gas generant pellets 11 burn, the spring 53 and filter 80 can move to the position $L_H$ as shown.

These variations of the second embodiment compared to the first embodiment filter provide a larger amount of gas generant pellets 11 to be used by having an adjustable filling volume by compressing the spring 53 and filter 80, otherwise, all the features in the first embodiment inflator 10 are found in the alternative second embodiment inflator 10A.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A cylindrical inflator comprises:
    an elongated tubular housing having a first end sealed by an igniter assembly and an opposite second end sealed by a diffuser assembly, the diffuser assembly having a first set of discharge openings sealed by frangible foil, and a combustion chamber interposed and extending between the igniter assembly and the foil sealed diffuser assembly;
    a hollow tubular filter positioned inside the combustion chamber having an enlarged first end compressed against an inner wall of the elongated tubular housing and an elongated narrow portion extending from the enlarged first end of the hollow tubular filter toward the second end of the tubular housing having an end attached to or abutting an internal end of the diffuser assembly, the elongated narrow portion being spaced from the elongated tubular housing to form a gas discharge plenum;
    a plurality of gas generant pellets at least partially filling the combustion chamber;
    a compressible spring having a first end and a second end, the first end of the spring abutting the enlarged first end of the hollow tubular filter; and
    a filter abutting the second end of the compressible spring, wherein upon ignition, the gas generant pellets generate inflation gases under pressure to enter and pass through the narrow portion of the hollow tubular filter filling the gas discharge plenum and bursting the foil opening the discharge openings and passing out the diffuser assembly.

2. The inflator of claim 1 wherein the gas discharge plenum externally encircles the elongated narrow portion of the hollow tubular filter.

3. The inflator of claim 2 wherein the gas discharge plenum extends longitudinally between the enlarged first end of the hollow tubular filter to the second end of the elongated tubular housing.

4. The inflator of claim 3 wherein the inflation gases generate a pressure of the ignited gas generant pellets that applies a seal burst force directed radially inwardly toward a center axis of the inflator.

5. The inflator of claim 4 wherein the diffuser assembly has a second set of discharge openings positioned radially to direct gas flow radially outward.

6. The inflator of claim 1 wherein the elongated tubular housing has an outer diameter of 35 mm or less.

7. The inflator of claim 1 wherein the elongated tubular housing has a longitudinal length $L_H$ of 25 cm or less.

8. The inflator of claim 1 wherein the elongated tubular housing has a longitudinal length $L_H$, wherein the hollow tubular filter extends inwardly a distance $L_F$ relative to the elongated tubular housing from the second end of the elongated tubular housing a distance less than half the elongated tubular housing longitudinal length $L_H$.

9. The inflator of claim 1 wherein the inflator has a gas generant pellets fill volume defined by a length $L_H$ of the elongated tubular housing minus a combined length $L_{F2}$ of the compressible spring and filter, the hollow tubular filter, and the diffuser assembly as measured from the second end of the elongated tubular housing.

10. The inflator of claim 9 wherein the compressible spring and filter move when a sufficient amount of gas generant pellets burn after ignition, such that the combined length $L_{F2}$ of the compressible spring and filter, the hollow tubular filter, and the diffuser assembly as measured from the second end of the elongated tubular housing becomes a new length $L_{F1}$, wherein $L_{F1}$ is less than $L_{F2}$.

11. The inflator of claim 1 wherein the compressible spring and filter provide a pushing force against the gas generant pellets prior to ignition.

* * * * *